(12) United States Patent
Cho et al.

(10) Patent No.: US 7,368,094 B2
(45) Date of Patent: May 6, 2008

(54) PLASMA-ASSISTED $NO_x$ REDUCTION

(75) Inventors: Byong K. Cho, Rochester Hills, MI (US); Jong-Hwan Lee, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 442 days.

(21) Appl. No.: 10/948,403

(22) Filed: Sep. 23, 2004

(65) Prior Publication Data
US 2006/0062709 A1    Mar. 23, 2006

(51) Int. Cl.
*B01D 53/56* (2006.01)
*B01D 53/94* (2006.01)

(52) U.S. Cl. .............. 423/213.2; 423/239.1; 423/239.2; 204/176

(58) Field of Classification Search ............. 423/213.2, 423/239.1, 239.2; 204/176
See application file for complete search history.

(56) References Cited

U.S. PATENT DOCUMENTS

| | | | |
|---|---|---|---|
| 4,351,811 A | 9/1982 | Matsuda et al. ............. 423/239 |
| 6,185,930 B1 * | 2/2001 | Lepperhoff et al. ........... 60/274 |
| 6,197,268 B1 | 3/2001 | Hwang et al. ............... 423/235 |
| 6,546,717 B1 | 4/2003 | Chandler et al. ............. 60/274 |
| 6,948,308 B2 * | 9/2005 | Chandler et al. ............. 60/274 |
| 7,090,811 B2 * | 8/2006 | Cho et al. ................. 423/239.2 |
| 2004/0188238 A1 * | 9/2004 | Hemingway et al. ....... 204/164 |

OTHER PUBLICATIONS

Russell Tonkyn et al, Vechicle Exhaust Treatment using Electrical Discharge Methods, pp. 1-6, SAE Paper 971716 (1997) no month.
M. Lou Balmer et al, Diesel NOx reduction on Surfaces in Plasma, pp. 1-6, SAE Paper 982511 (1998) no month.
International Search Report for PCT/US05/28206 mailed Aug. 28, 2006 corresponding to the subject application.

* cited by examiner

*Primary Examiner*—Timothy C. Vanoy

(57) ABSTRACT

Ozone, preferably produced in an ambient air stream passed through a non-thermal hyperplasma reactor, is added to the hot exhaust gas stream from a lean-burn (oxygen-rich) combustion source. The ozone converts much of the NO in the NO containing exhaust stream to $NO_2$. The resulting $NO_2/NO_x$ ratio can be controlled by the input energy density to the plasma reactor. Ammonia and/or urea is added to the ozone treated exhaust in proportion to the $NO_x$ content, and the stream passed into contact with a reduction catalyst, such as a base metal-exchanged zeolite, to convert the $NO_x$ to nitrogen.

11 Claims, 4 Drawing Sheets

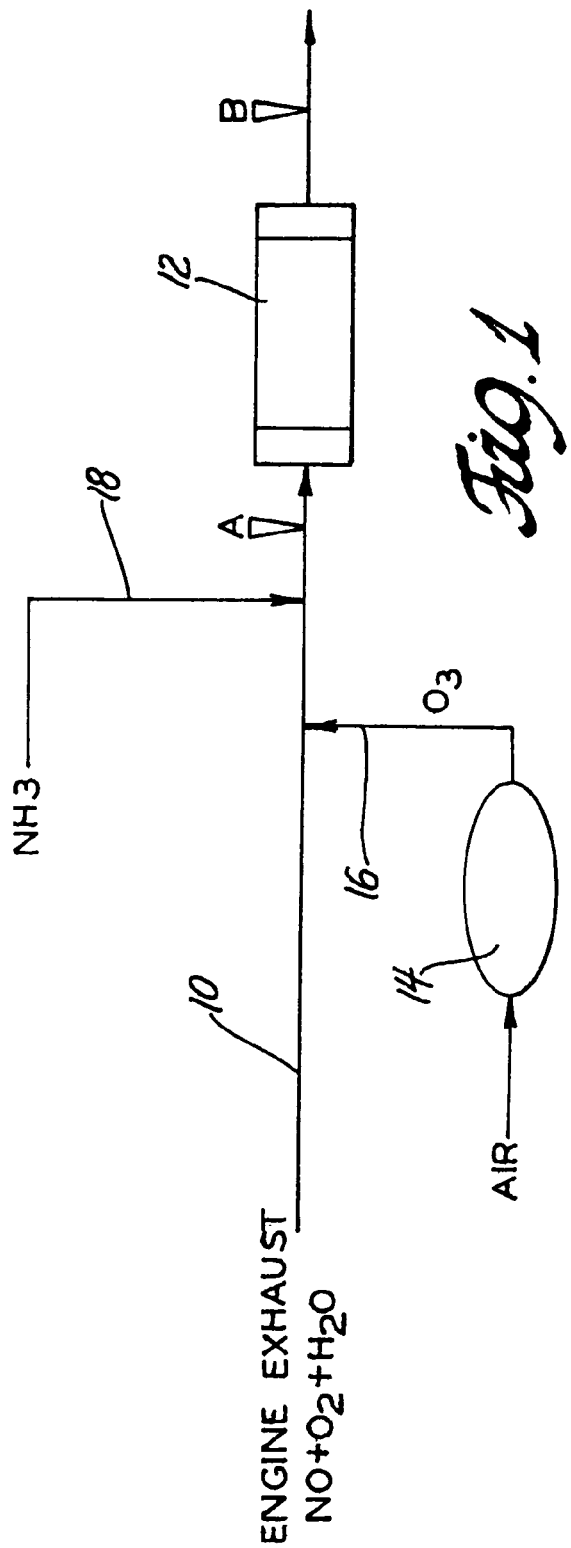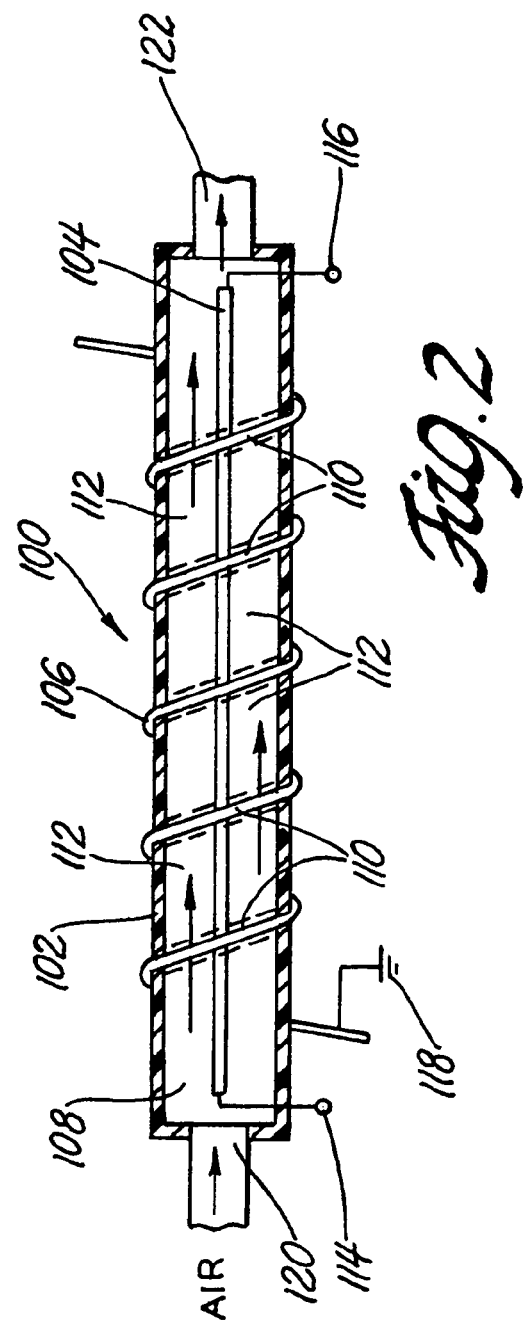

PLASMA-ASSISTED $NO_x$ REDUCTION

TECHNICAL FIELD

The present invention relates generally to reduction of nitrogen oxides in exhaust gas from a diesel engine or other lean-burn combustion engine. More specifically, this invention pertains to treating the $NO_x$ content of the exhaust with the separate additions of ozone and ammonia (or urea) before passing the oxygen-rich exhaust into contact with a selective reduction catalyst for $NO_x$ such as copper exchanged ZSM-5 zeolite catalyst.

BACKGROUND OF THE INVENTION

Diesel engines are operated at higher than stoichiometric air to fuel mass ratios for improved fuel economy. Such lean-burning engines produce a hot exhaust with a relatively high content of oxygen and nitrogen oxides ($NO_x$). The temperature of the exhaust from a warmed up diesel engine is typically in the range of 200° to 400° C. and has a representative composition, by volume, of about 10-17% oxygen, 3% carbon dioxide, 0.1% carbon monoxide, 180 ppm hydrocarbons, 235 ppm $NO_x$ and the balance nitrogen and water. These $NO_x$ gases, typically comprising nitric oxide (NO) and nitrogen dioxide ($NO_2$), are difficult to reduce to nitrogen ($N_2$) because of the high oxygen ($O_2$) content and the water content in the hot exhaust stream.

It has been proposed to add gaseous or vaporizable hydrogen-containing substances such as ammonia, urea, or hydrocarbons to the oxygen-rich exhaust gas to provide reactants for the conversion of $NO_x$ to nitrogen over a suitable catalyst. The practice is termed selective catalytic reduction of $NO_x$ (SCR) and catalysts such as certain base metal-exchanged zeolite catalysts have been tested to accomplish this difficult chemical reduction task. Selective catalytic reduction of $NO_x$ by $NH_3$ is one of the most promising technologies known for the control of $NO_x$ emissions from lean-burn engine exhausts. Due to the difficulties associated with the storage and transportation of $NH_3$, however, urea has been widely used as a preferred source of $NH_3$ for automotive applications, based on the fact that one molecule of urea can produce two molecules of $NH_3$ through thermal decomposition. The $NO_x$ conversion performance of typical catalysts for $NH_3$ assisted SCR is excellent over a wide temperature range above 250° C., but the low-temperature activity below 250° C. remains a major problem.

It is, thus, an object of the present invention to provide an improved method of reducing $NO_x$ in such oxygen-rich, nitrogen oxide containing mixtures, especially at temperatures below about 250° C. It is a more specific object of the present invention to provide a method of modifying lean-burn, hydrocarbon fueled engine exhaust with ozone (from plasma treated ambient air) and ammonia (or the equivalent) before the exhaust is brought into contact with a $NO_x$ reduction catalyst.

SUMMARY OF THE INVENTION

This invention provides a method of reducing $NO_x$ in a lean burn engine exhaust stream using a reduction reactor containing a selective reduction catalyst for $NO_x$. In accordance with the method, separate additions of ozone (preferably from non-thermal plasma treated ambient air) and ammonia or urea are made to the exhaust gas stream upstream of the catalytic reduction reactor. These additions modify the exhaust gas composition to improve the performance of $NO_x$ reduction catalysts, especially at temperatures below about 250° C. The practice of the invention will be illustrated using copper ion exchanged ZSM-5 zeolite catalysts (Cu/ZSM-5).

In accordance with the present invention, the $NO_x$ containing exhaust is ultimately passed into contact with a suitable SCR catalyst. In a preferred embodiment, the effectiveness of the reduction catalyst is promoted by prior addition of ozone to the exhaust followed by the addition of ammonia. The ozone addition converts much of the NO content of the exhaust to $NO_2$ before the exhaust stream reaches the reduction catalyst reactor. In the catalytic reactor the ammonia participates in the reduction of NO and $NO_2$ to $N_2$ over Cu/ZSM-5 or other suitable SCR catalyst.

Ozone for addition to the exhaust stream is generated by passing ambient air through a suitable ozone generator. The ozone containing air is injected into the exhaust stream. Ammonia (or urea) is stored on-board the vehicle and injected as a vapor or gas (or as liquid spray jets in the case of urea) into the exhaust gas downstream of the ozone addition. The ammonia is an effective reductant species for $NO_2$ in combination with the SCR catalyst. Aqueous urea solution may be used as the reductant when it is necessary or more convenient to store and inject the reductant in liquid form.

Preferably an efficient non-thermal hyperplasma reactor is used to treat a stream of ambient air. The plasma reactor is suitably a tube having a dielectric cylindrical wall defining a reactor space. A linear, high voltage electrode is disposed along the axis of the tube within this reactor space. An outer ground electrode, comprised of electrically conductive wire, is spirally wound around the cylindrical dielectric wall in a sequential pattern having a selected pitch that provides an axially discrete spacing between each turn of the wire. Application of a high frequency, AC voltage to the central electrode creates plasma in the ambient air passed through the reactor. The combination of the helical ground electrode having a discrete spacing between each turn and the linear axial high voltage electrode produces intertwined helical regions of active and passive electric fields. Oxygen molecules in the air stream are converted to ozone and other activated oxygen species for oxidation of NO to $NO_2$ in the exhaust.

The amount of ozone produced in the air stream flowing through the plasma reactor is in proportion to the electrical energy applied to the reactor. And the conversion of NO to $NO_2$ in the exhaust stream increases as the amount of ozone added to the exhaust is increased. Thus, controlling the power (Joules per second, J/s) applied to the plasma reactor based on the total exhaust stream flow rate (liters per second, L/s), entering the catalytic reduction reactor (which is viewed as the energy density, J/L, of the plasma reactor) is a preferred way of controlling the $NO_2/NO_x$ ratio of the exhaust stream entering the SCR reactor. In general, the optimum $NO_2/NO_x$ feed ratio to the reduction catalytic reactor for the maximum $NO_x$ conversion in $NH_3$/SCR depends on the catalyst, reaction temperature and the exhaust gas composition.

In a specific embodiment the invention has been demonstrated to achieve a nearly 85% conversion of $NO_x$ to $N_2$ over Cu/ZSM-5 at a catalyst temperature of 200° C.

The exhaust leaving a diesel engine contains gaseous unburned hydrocarbons, diesel carbon/hydrocarbon particulates, and carbon monoxide that are preferably reduced or eliminated by catalytic oxidation and filtering of the exhaust prior to ozone addition to the exhaust.

Other objects and advantages of the invention will be apparent from a description of a preferred embodiment which follows.

BRIEF DESCRIPTION OF THE DRAWINGS

FIG. 1 is a schematic flow diagram for separate introduction of ozone and ammonia into the exhaust from a lean-burn engine in preparation for SCR.

FIG. 2 is a cross-section of a non-thermal hyperplasma reactor tube for producing ozone in ambient air for introduction into the $NO_x$-containing exhaust stream.

DESCRIPTION OF PREFERRED EMBODIMENTS

Figure 3:
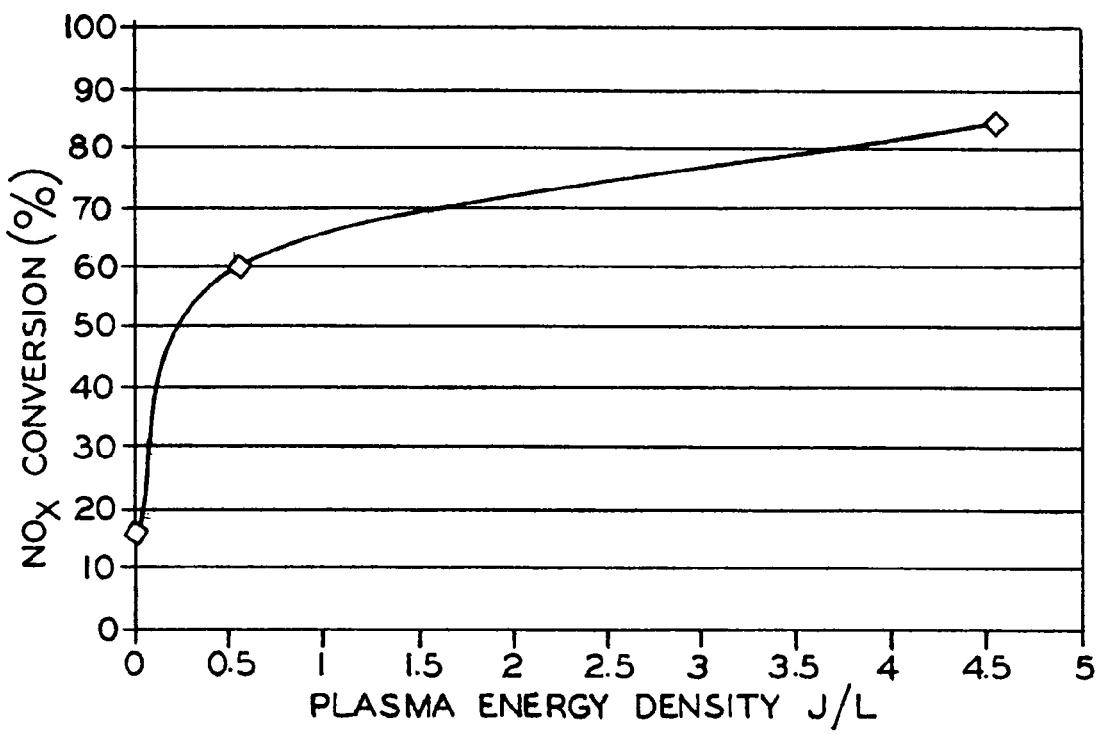
FIG. 3 is a graph showing the effect of energy density (J/L) in the plasma reactor with respect to the volume of the exhaust stream entering the catalytic reduction reactor on conversion of $NO_x$ (in % converted) in a plasma-assisted $NH_3$/SCR system in which the temperature of the catalyst (2.5% Cu/ZSM-5) was kept at 200° C.

In prior art practices of the plasma-assisted lean-$NO_x$ reduction, the exhaust stream from a diesel engine is passed through a plasma reactor and then through a catalytic reduction reactor in an attempt to convert the $NO_x$ constituents to nitrogen. In such a practice, the plasma reactor is exposed to the high temperature and highly corrosive nature of the exhaust gas, and the entire exhaust is treated to help the performance of the reduction catalyst. But in accordance with this invention, a comparatively low volume, innocuous ambient air stream is passed, when needed, through a non-thermal hyperplasma reactor to generate ozone in the oxygen/nitrogen gas mixture. The ozone-containing side stream is injected into the hot and corrosive exhaust stream to convert some NO to $NO_2$. Ammonia is separately added to the exhaust, preferably downstream of the plasma generated ozone addition. This combination of plasma-generated ozone addition and separate ammonia addition improves the performance of the SCR system catalyst in the overall conversion of $NO_x$ to nitrogen. The improvement is particularly effective in exhaust streams that are relatively cool, for example at engine and exhaust warm-up temperatures below 250° C.

A flow diagram of a preferred embodiment of the practice of the invention is illustrated in FIG. 1. An exhaust stream 10 from the exhaust manifold of an engine operating at an air-to-fuel mass ratio well above the stoichiometric ratio is to be treated to reduce the $NO_x$ content to nitrogen. When the exhaust stream is from a gasoline-fueled engine operated, for example, at A/F>17, the exhaust gas contains some unburned hydrocarbons, $NO_x$ (mainly a mixture of NO and $NO_2$ with some $N_2O$), carbon monoxide, carbon dioxide, water and nitrogen. The exhaust from a diesel engine contains the same gaseous constituents plus suspended diesel particulates (composed of high molecular weight hydrocarbons deposited on carbon particles). Such hydrocarbon containing exhausts may be filtered to remove particulate matter and passed through a catalytic oxidation reactor to complete the combustion of hydrocarbons and oxidation of carbon monoxide. There is abundant oxygen in the exhaust gas for these reactions. These filtering and oxidation processes are not part of this invention and not illustrated in FIG. 1. The focus of this invention is on the $NO_x$ content of the exhaust, and exhaust stream 10 is directed through a suitable exhaust conduit to a catalytic reduction reactor 12 containing a suitable selective reduction catalyst for $NO_x$. However, two critical components are added to exhaust stream 10 before it reaches reduction reactor 12.

Ambient air is blown or drawn through a non-thermal hyperplasma reactor 14. The plasma generated in the air stream converts some of the oxygen molecules to ozone. The amount of ozone generated is related to the level of electric power applied to the plasma reactor 14. Other activated oxygen species may also be generated. The ozone containing stream 16 is added to the exhaust stream 10 upstream of catalytic reduction reactor 12. The construction and operation of a suitable hyperplasma reactor is more fully illustrated in FIG. 2 and described in connection with that figure. The ozone is used for oxidation of NO to $NO_2$ and the energy level of the ozone generator is based on the amount of NO in the exhaust that is to be oxidized.

Following the ozone addition for NO oxidation, ammonia is added to exhaust stream 10. Ammonia can be stored in a suitable form (such as liquid ammonia or as urea) on-board a lean burn engine vehicle, or near-by a stationary engine, and added as stream 18 to the ozone-treated exhaust upstream of catalytic reactor 12.

In FIG. 2, a non-thermal hyperplasma reactor 100 is illustrated that is suitable for generating ozone in a stream of air. The reactor 100 is sized and powered for its specific application.

Non-thermal plasma reactor 100 comprises a cylindrical tubular dielectric body 102. The reactor 100 has two electrodes, a high voltage electrode 104 and a ground electrode 106, separated by the tubular dielectric body 102 and an air gap 108. The high voltage electrode 104 is a straight rod placed along the longitudinal axis of the tube 102. The ground electrode 106 is a wire wound around the tubular dielectric body 102 in a helical pattern. The helical ground electrode 106 in combination with the axial high voltage electrode 104 provides intertwined helical regions of active 110 and passive 112 electric fields along the length of the reactor 100. The helical active electric field 110 around the ground electrode 106 is highly focused for ozone generation.

A high voltage, high frequency electrical potential is applied to the end leads 114, 116 to the center electrode 104. The helical outer ground electrode 106 is grounded as indicated at 118. In the operation of the plasma reactor 100 as hyperplasma ozone generator 14 (FIG. 1) ambient air flows through the air inlet 120 of reactor 100 around center electrode 104 and within dielectric tube 102 and out exit end 122 in the direction of the arrows seen in FIG. 2. The electrical potential applied to center electrode 104 generates the above described active 110 and passive 112 fields within the reactor 100. These high potential, high frequency fields 110, 112 generate ozone and reactive oxygen species within the flowing ambient air stream in the air gap 108. This ozone-containing air stream leaves the reactor 100 (14 in FIG. 1) and enters exhaust stream 10 as indicated in FIG. 1. The exit 122 of reactor 100 is in fluid flow connection with the exhaust duct of the engine that carries exhaust stream 10.

EXPERIMENTAL

A simulated diesel exhaust gas composed, by volume, of 174 ppm NO, 15 ppm $NO_2$, 15% $O_2$ and the balance $N_2$ was used in the following laboratory scale tests. In tests in which water was added (see discussion of FIG. 6), the simulated exhaust contained 1.7% by volume water vapor. This simulated exhaust gas was used as stream 10 in FIG. 1 for catalytic reduction in a catalytic reduction reactor as indicated at 12 in FIG. 1.

The laboratory catalytic reduction reactor was made of a quartz tube with a ¼ inch (about 6.4 mm) outside diameter, 4 mm inside diameter, and containing Cu/ZSM-5 catalyst particles containing 2.5 weight % copper. ZSM-5 zeolite was obtained in the hydrogen form (H-ZSN-5) from Zeolyst Corp. The copper-exchanged zeolite catalyst was prepared by aqueous ion exchange of H-ZSM-5 with Cu $(NO_3)_2$ and was used in the form of a 30-40 mesh powder after calcination at 500° C. for 20 hours. The catalytic reactor was placed in an electric furnace whose temperature was controlled using a thermocouple located at the exit of the catalytic reactor.

A purpose of the process of this invention is to improve the conversion of $NO_x$ at low exhaust temperatures, for example below about 250° C. In the following tests the catalytic reactor was maintained at 200° C. and ozone-treated and ammonia containing exhaust gas was passed through the reduction reactor at a space velocity of 57 K/h. Details of standard experimental conditions used for the laboratory reactor system are summarized in the following Table.

Hyperplasma Reactor:
AC Voltage (HV)=variable [0-16 kV (p/p)]
Energy Density of Plasma (Ep)=variable (0-4.5 J/L)
T=Room Temperature
Air=45 sccm Catalyst: 2.5 wt % Cu/ZSM-5
30-40 mesh powder
Space Velocity=57K/h
T=200° C.

Simulated Exhaust Composition:
NO=14 ppm
$NO_2$=15 ppm
$O_2$=15%
$H_2O$=1.7% (if present)
$N_2$=balance $NH_3$ feed conc.: 185 ppm Total flow rate: 163 sccm (dry basis)

System Pressure: 101.3 kPa

A flow-through hyperplasma reactor for ozone production from ambient air was made in accordance with the reactor illustrated in FIG. 2. The reactor was made of 8 mm outside diameter (6 mm inside diameter) quartz tube that served as a dielectric barrier. With the high voltage electrode in the center, it was made in a concentric cylindrical geometry. The ground electrode was made of a Ni wire wound around the outer surface of the quartz tube in 20 turns at a pitch of 2 mm. The total length of the plasma generating volume was 4 cm. It was operated at room temperature. A high alternating voltage was applied to the center electrode as air was blown through the tube at a rate of 45 cubic centimeters per minute at standard conditions (sccm). The power available for plasma generation was varied in the following experiments by varying the voltage from 0-16 kV (p/p). The energy density was thus variable from 0 to 4.5 joules per liter (J/L) of total exhaust gas volume at the catalytic reactor inlet. The stream exiting the plasma reactor comprises ozone, oxygen, nitrogen, and possibly other plasma activated species of oxygen. It is believed that the ozone and active oxygen oxidize NO to $NO_2$ in the exhaust stream even at temperatures as low as ambient temperatures.

In the experiments described below, the stream from the hyperplasma reactor (operated at 0-4.5 J/L) was added to the exhaust stream at a rate of 45 sccm and then ammonia was added to the exhaust stream to obtain an ammonia content of 185 ppm. This ammonia content is roughly equivalent to the NO plus $NO_2$ content of the simulated exhaust. The exhaust stream, now including the side stream from the hyperplasma reactor and ammonia, entered the Cu/ZSM-5 reduction reactor at a pressure of 101.3 kPa and a total flow rate of 163 sccm (dry basis).

The effluent stream from the catalytic reduction reactor was chemically analyzed especially for nitrogen containing compounds. Samples were taken at location B in FIG. 1. FIG. 3 shows the effect of plasma energy density on the $NO_x$ conversion performance of the plasma-assisted NH3/SCR system, where the temperature of the catalyst (2.5% Cu/ZSM-5) was kept at 200° C. The beneficial effect of the sidestream air-plasma is rather dramatic, improving the $NO_x$ conversion performance from 15.9% with plasma off (0 J/L) to 84.9% with plasma on at 4.5 J/L. Even when the plasma energy density was only 0.5 J/L, the conversion of $NO_x$ in the simulated exhaust increased to 60% at the relatively low catalyst temperature. Sufficient ozone was produced in the non-thermal hyperplasma generator to convert enough NO to $NO_2$ to markedly improve the performance of the $NH_3$/SCR reduction system. However, further improvement in $NO_x$ conversion required the use of higher plasma energy density.

Figure 4:
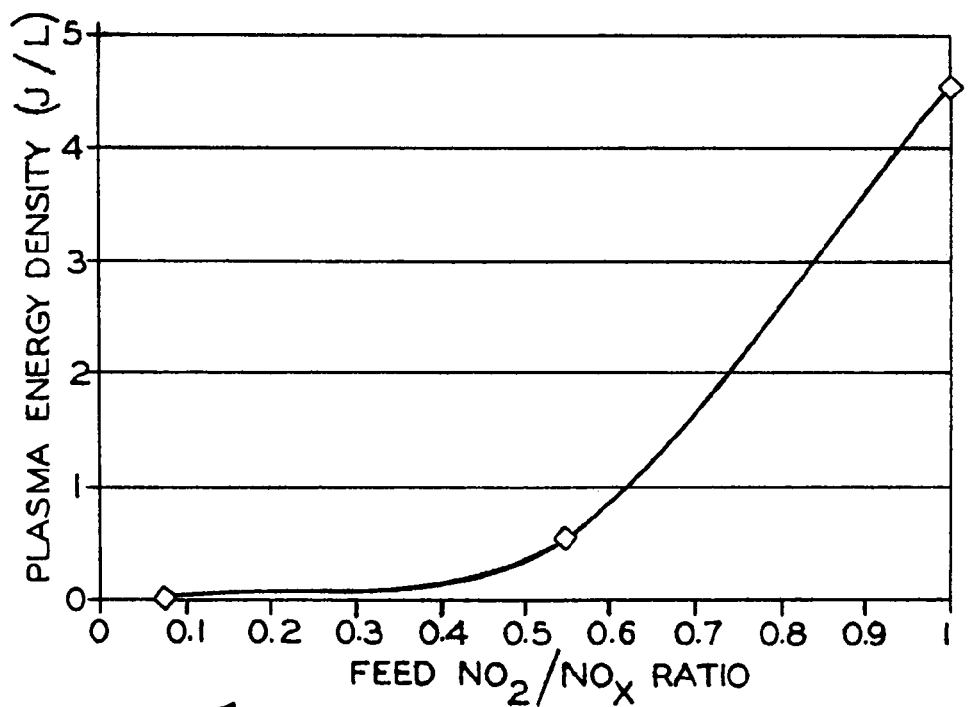
FIG. 4 is a graph showing the effect of energy density (J/L) of an ozone-generating hyperplasma reactor required to achieve a desired $NO_2/NO_x$ ratio in the exhaust feed to the SCR reactor, as measured at sampling location A in FIG. 1.

FIG. 4 shows the plasma energy density required to achieve a desired $NO_2/NO_x$ ratio in the feed to the catalyst, as measured at sampling location A in FIG. 1. In this work the plasma energy density was based on the flow rate of the total exhaust stream entering the catalytic reduction reactor in liters per second at standard conditions. This stream includes the ozone-containing side stream. Thus, the energy in joules per second applied to the plasma reactor is based on the exhaust flow rate in liters per second and the energy density is abbreviated as J/L.

The $NO_2/NO_x$ ratio of the simulated exhaust was about 0.08 before the sidestream addition of the plasma reactor stream. FIG. 4 clearly illustrates that the $NO_2/NO_x$ feed ratio at the catalytic reactor inlet can easily be controlled by the input energy density to the plasma reactor. The required plasma energy density increases more rapidly with the desired increase in the feed ratio of $NO_2/NO_x$. It takes about 0.5 J/L for the $NO_2/NO_x$ ratio of 0.5, while taking 4.5 J/L to achieve the ratio of 1.0. This indicates that a complete conversion of NO to $NO_2$ by the air plasma is much more difficult than a conversion to 50% $NO_2$ content. But, again, the effect of higher conversion of NO to $NO_2$ on $NO_x$ reduction to nitrogen in the $NH_3$/SCR system is illustrated in FIG. 3.

Figure 5:
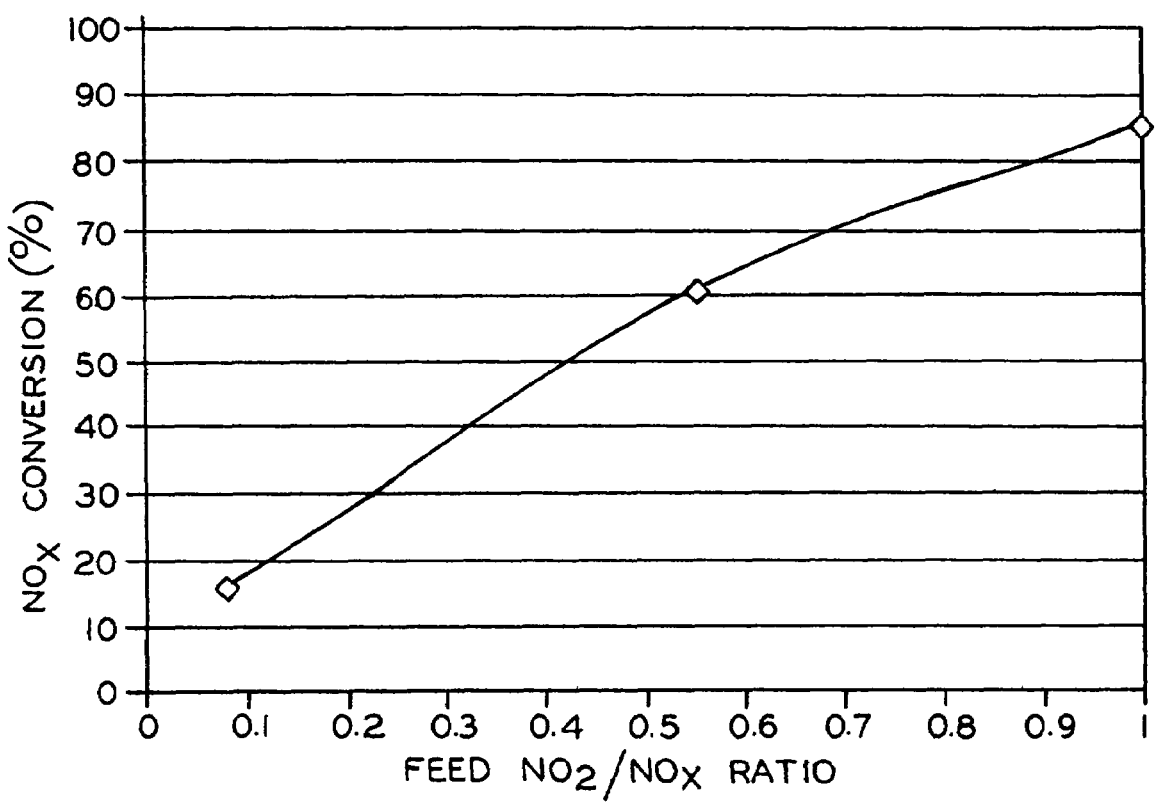
FIG. 5 is a graph showing the effect of the feed $NO_2/NO_x$ ratio at the catalytic reactor inlet on the conversion of $NO_x$ (in % converted) in a plasma-assisted $NH_3$/SCR system in which the temperature of the catalyst (2.5% Cu/ZSM-5) was kept at 200° C.

FIG. 5 shows the effect of the feed $NO_2/NO_x$ ratio at the catalytic reactor inlet on the $NO_x$ conversion performance of the plasma assisted $NH_3$/SCR system, where the temperature of the catalyst (2.5% Cu/ZSM-5) was kept at 200° C. It clearly demonstrates the $NO_x$ conversion performance of the Cu/ZSM-5 catalyst improves monotonically with the increase of the feed $NO_2/NO_x$ ratio, with the maximum $NO_x$ conversion at the $NO_2/NO_x$ ratio of unity. This indicates that $NO_2$ is more reactive toward $NH_3$ than NO for $NH_3$/SCR over this catalyst. In general, however, the optimum $NO_2/NO_x$ feed ratio for the maximum $NO_x$ conversion in $NH_3$/SCR depends on the catalyst, reaction temperature and the exhaust gas composition.

Figure 6:
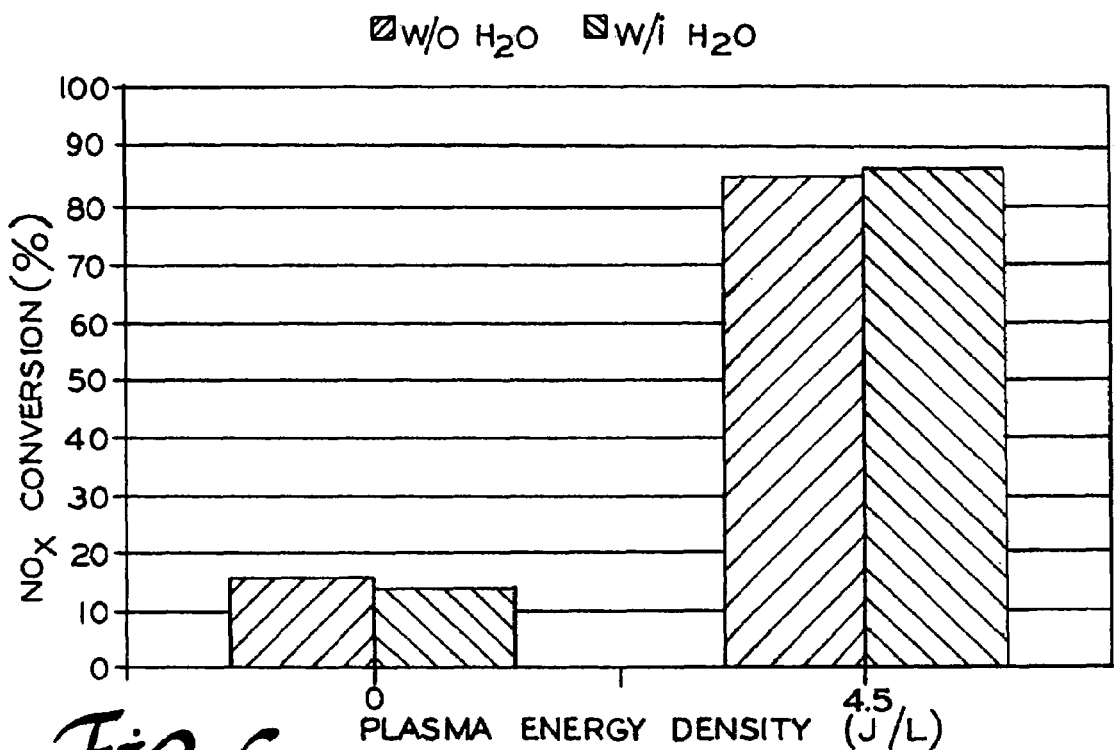
FIG. 6 is a bar graph showing the effect of 1.7 weight percent water in the exhaust stream on $NO_x$ conversion performance of the system at energy densities of zero J/L and 4.5 J/L applied to the hyperplasma ozone generator.

FIG. 6 shows the effect of 1.7 wt % water vapor in the exhaust stream on $NO_x$ conversion performance of the $NH_3$ reductant and Cu/ZSM-5 reduction catalyst system with the plasma reactor turned off (0 J/L) and at the plasma reactor energy density level of 4.5 J/L. This data strongly suggests that the effect of water vapor on the reduction catalyst system is not strongly dependent on the plasma energy density.

Figure 7:
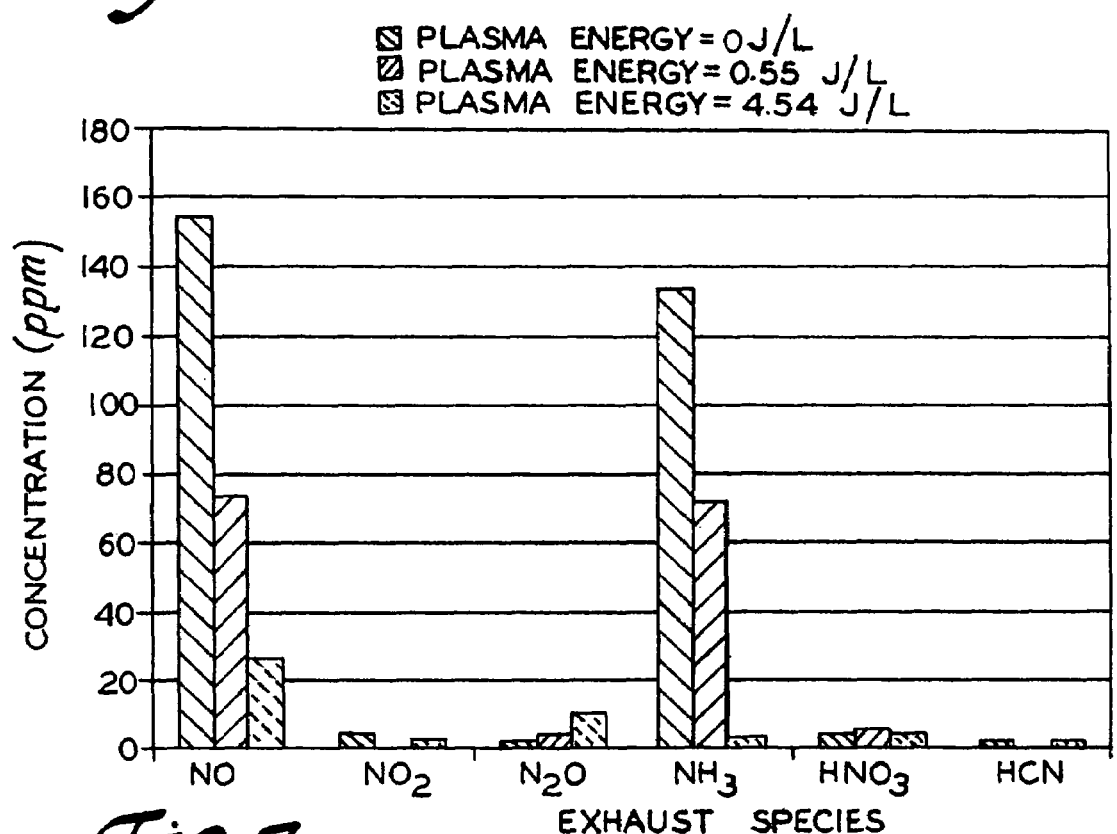
FIG. 7 is a bar graph showing exhaust composition measured at catalyst exit (sampling location B in FIG. 1) for three hyperplasma ozone generator energy levels (0 J/L, 0.55 J/L and 4.54 J/L). Exhaust species concentration data, in ppm, for NO, $NO_2$, $N_2O$, $NH_3$, $HNO_3$ and HCN are provided.

FIG. 7 shows exhaust composition measured at the catalyst exit (sampling location B in FIG. 1) for three different plasma energy density levels (0 J/L, 0.55 J/L, and 4.54 J/L). It is important to note in this data that both $NO_x$ (NO and $NO_2$) and $NH_3$ emissions decrease sharply with the increase of the plasma energy density. On the other hand, $N_2O$ emission increases with the increase of the plasma energy density, even though the level of $N_2O$ emission remains negligible. These observations suggest that there is an optimum plasma energy density for the best balance among $NO_x$, $NH_3$ and $N_2O$ emissions. Of course, in these experiments, the traces of $N_2O$, $HNO_3$ and HCN found in the exhaust were not in the initial simulated exhaust stream.

It is seen that the sidestream addition of hyperplasma reactor-treated ambient air markedly improves the conversion of $NO_x$ to nitrogen in an ammonia/SCR system. The improvement is dramatic even when the selective reduction catalyst has not been heated substantially above 200° C. Such low temperatures occur, for example, during engine and exhaust warm-up periods and it is important to reduce $NO_x$ during such periods of engine operation. It is known that ammonia or urea SCR systems can be made productive at exhaust temperatures of 250° C. and higher. Accordingly, this practice can be programmed for operation of the sidestream hyperplasma reactor at operating periods when it is most needed.

The practice of the invention has been illustrated using a Cu/ZSM-5 catalyst system. But the beneficial effect of the plasma treated air is applicable to other SCR catalyst systems devised for $NO_x$ reduction in lean-burn exhausts. Many other catalysts offer promise for $NO_x$ reduction processes. They include single-bed and dual-bed base metal exchanged zeolite catalysts, silver and noble metal catalysts and noble metal exchanged zeolite catalysts. The energy level of the non-thermal plasma reactor is controlled to achieve the desired conversion of NO to $NO_2$ in the $NO_x$ containing exhaust. And the addition of ammonia or urea or other reductant for $NO_x$ is in proportion to the normal $NO_x$ content of the exhaust.

Accordingly, the practice of the invention has been illustrated in terms of certain preferred embodiments. But the scope of the invention is not limited to the illustrated embodiments.

The invention claimed is:

1. A method of treating nitrogen oxides, comprising NO and $NO_2$, in an exhaust stream from a lean-burn combustion source, the exhaust stream being at a temperature below 250° C., the method comprising:
    passing a stream of ambient air through intertwined helical regions of active and passive electric fields produced in a high frequency alternating current powered non-thermal plasma generator to produce a stream containing ozone, wherein the non-thermal plasma generator comprises a tube having a dielectric cylindrical wall defining a reactor space; a linear, high voltage electrode disposed along the axis of the tube; and an outer ground electrode spirally wound around the external surface of the dielectric cylindrical wall in an axially discrete pattern, and wherein the amount of ozone produced in the stream flowing through the annular space formed between the dielectric cylindrical tube and the central high-voltage electrode is proportional to the electrical energy applied to the generator;
    adding the ozone-containing stream to the exhaust stream to convert at least a portion of the NO content to $NO_2$;
    separately adding to the ozone-containing exhaust stream a reductant for NO and $NO_2$, the reductant being selected from the group consisting of ammonia and urea; and
    passing the resulting exhaust stream into contact with a reduction catalyst for nitrogen oxides at a suitable space velocity for conversion of nitrogen oxide in the exhaust stream to nitrogen.

2. The method of treating nitrogen oxides in an exhaust stream as recited in claim 1 comprising:
    controlling the conversion of NO to $NO_2$ by controlling the amount of ozone added to the exhaust stream.

3. The method of treating nitrogen oxides in an exhaust stream as recited in claim 1 further comprising controlling the conversion of NO to $NO_2$ by controlling the level of electrical power applied to the non-thermal plasma reactor.

4. The method of treating nitrogen oxides in an exhaust stream as recited in claim 1 in which the reduction catalyst comprises a base metal-exchanged zeolite reduction catalyst.

5. The method of reducing nitrogen oxides in an exhaust stream as recited in claim 4 in which the reduction catalyst comprises Cu/ZSM-5.

6. The method of reducing nitrogen oxides, $NO_x$, in an exhaust stream as recited in claim 1 comprising:
    applying electrical energy density to the plasma generator in proportion to a desired conversion of NO to $NO_2$ in the exhaust stream;
    separately adding the reductant in molar proportion to the $NO_x$ content of the exhaust stream; and
    passing the resulting exhaust stream into contact with a base metal-exchanged zeolite reduction catalyst.

7. A method of treating nitrogen oxides, comprising NO and $NO_2$, in an exhaust stream from a diesel engine, the exhaust stream being at a temperature below 250° C., the method comprising:
    passing a stream of ambient air through intertwined helical regions of active and passive electric fields produced in a high frequency alternating current powered non-thermal plasma generator to produce a stream containing ozone, wherein the non-thermal plasma generator comprises a tube having a dielectric cylindrical wall defining a reactor space; a linear, high voltage electrode disposed along the axis of the tube; and an outer ground electrode spirally wound around the external surface of the dielectric cylindrical wall in an axially discrete pattern, and wherein the amount of ozone produced in the stream flowing through the annular space formed between the dielectric cylindrical tube and the central high-voltage electrode is proportional to the electrical energy applied to the generator;

adding the ozone-containing stream to the exhaust stream to convert at least a portion of the NO content to $NO_2$;

separately adding to the ozone-treated exhaust stream a reductant for NO and $NO_2$, the reductant being selected from the group consisting of ammonia and urea; and passing the resulting exhaust stream into contact with a reduction catalyst for nitrogen oxides at a suitable space velocity for conversion of nitrogen oxides in the exhaust stream to nitrogen.

8. The method of treating nitrogen oxides in an exhaust stream from a diesel engine as recited in claim 7 comprising:

controlling the conversion of NO to $NO_2$ by controlling the level of electrical power applied to the non-thermal plasma reactor.

9. The method of treating nitrogen oxides in an exhaust stream from a diesel engine as recited in claim 7 in which the reduction catalyst comprises a base metal-exchanged zeolite reduction catalyst.

10. The method of reducing nitrogen oxides in an exhaust stream from a diesel engine as recited in claim 9 in which the reduction catalyst comprises Cu/ZSM-5.

11. The method of reducing nitrogen oxides, $NO_x$, in an exhaust stream from a diesel engine as recited in claim 7 comprising:

applying electrical energy density to the plasma generator in proportion to a desired conversion of NO to $NO_2$ in the exhaust stream;

separately adding the reductant in molar proportion to the $NO_x$ content of the exhaust stream; and passing the resulting exhaust stream into contact with a base metal-exchanged zeolite reduction catalyst.

* * * * *